United States Patent [19]

Wiederhöft et al.

[11] Patent Number: 4,988,495
[45] Date of Patent: Jan. 29, 1991

[54] PROCESS FOR THE RECORVERY OF SULPHURIC ACID IN THE PRODUCTION OF TITANIUM DIOXIDE

[75] Inventors: Gerhard Wiederhöft, Krefeld, Fed. Rep. of Germany; Eckhard Bayer, Pittsburgh, Pa.; Wolfgang D. Müller; Günter Lailach, both of Krefeld, Fed. Rep. of Germany

[73] Assignee: Bayer Aktiengesellschaft, Leverkusen, Fed. Rep. of Germany

[21] Appl. No.: 451,267

[22] Filed: Dec. 15, 1989

[30] Foreign Application Priority Data

Dec. 24, 1988 [DE] Fed. Rep. of Germany ....... 3843846

[51] Int. Cl.$^5$ ............................................. C01G 23/53
[52] U.S. Cl. ...................................... 423/616; 423/82; 423/83; 423/85; 423/610; 423/615; 106/436
[58] Field of Search ..................... 423/82, 83, 85, 610, 423/615, 616; 106/436

[56] References Cited

U.S. PATENT DOCUMENTS

| Re. 18,790 | 4/1933 | Mecklenburg | 423/615 |
|---|---|---|---|
| 1,851,487 | 3/1932 | Blumenfeld | 423/616 |
| 2,331,496 | 10/1943 | Olson | 423/616 |
| 2,774,650 | 12/1956 | Oppegaard | 423/82 |
| 3,368,870 | 2/1968 | Soloducha | 423/85 |
| 4,288,418 | 9/1981 | Davis et al. | 423/82 |
| 4,663,131 | 5/1987 | Gerken et al. | 429/82 |

FOREIGN PATENT DOCUMENTS

| 540863 | 5/1928 | Fed. Rep. of Germany . |
| 2729755 | 1/1979 | Fed. Rep. of Germany . |
| 310949 | 1/1929 | United Kingdom . |

OTHER PUBLICATIONS

Grant et al, *Grant & Hackh's Chemical Dictionary* 5th Ed., McGraw Hill Book Co., 1987, p. 573.

Primary Examiner—Gary P. Straub
Assistant Examiner—Stephen G. Kalinchak
Attorney, Agent, or Firm—Sprung Horn Kramer & Woods

[57] ABSTRACT

A process for the preparation of an improved quality $TiO_2$ pigment by hydrolysis of titanyl sulphate, isolation of the hydrolysis product form the waste acid produced during the hydrolysis, washing of the hydrolysis product and calcination of the hydrolysis product to form the $TiO_2$ pigment, wherein the hydrolysis of the titanyl sulphate is carried out using separately produced hydrolysis nuclei which have been produced by a reaction of titanium salts with alkaline reagents, and in which waste acid and/or wash liquid containing waste acid is added after at least 50% of the total duration of the hydrolysis process.

3 Claims, No Drawings

PROCESS FOR THE RECOVERY OF SULPHURIC ACID IN THE PRODUCTION OF TITANIUM DIOXIDE

The invention relates to a process for the recovery of sulphuric acid, which is obtained as waste acid in the production of $TiO_2$ by the sulphate process, the concentration of the waste acid intended for concentration and isolation of the metal sulphates being increased by adding waste acid or wash liquid having a lower $H_2SO_4$ content, which is obtained during washing of the $TiO_2$ hydrolysis product, during hydrolysis of the titanyl sulphate.

It is known that it is generally advantageous from the economic point of view to increase the sulphuric acid concentration in the waste acid intended for sulphuric acid recovery or dumping in the sea. For example, the result of increasing the sulphuric acid concentration from 23 to 25% is that about 15% less water has to be evaporated off from the waste acid before isolation of the metal sulphate.

In view of this advantage, for example, DE-C 27 29 755 has proposed recycling waste acid or wash liquid to the ilmenite digestion. However, particular limits must be observed if, for example, deterioration in pigment quality due to the simultaneously recycled heavy metal ions relevant for shade is to be avoided.

U.S. Pat. No. 2,331,496 discloses a process for the hydrolysis of titanium salts, in which hydrolysis nuclei are first formed in dilute solution before the main amount of the titanium salt solution is added. Instead of water, it is also possible to take a wash solution or a liquid having a relatively low titanium content for nucleus formation. However, because the pH should be kept constant at about 1.2 during nucleus formation and aging, these liquids may contain only insignificant amounts of sulphuric acid. Thus, there is no possibility here of achieving a marked increase in the concentration of the waste acid by recycling significant amounts of waste acid or wash liquid.

It was therefore the object to provide a process by means of which the $H_2SO_4$ concentration in the waste acid is increased without resulting in a substantial deterioration in the hydrolysis yield or deterioration in the pigment quality.

The invention relates to a process for the preparation of $TiO_2$ pigments by hydrolysis of titanyl sulphate, isolation of the hydrolysis product from the waste acid produced during the hydrolysis, washing of the hydrolysis product and calcination of the hydrolysis product with formation of $TiO_2$ pigments, in which the hydrolysis of the titanyl sulphate is carried out using separately produced hydrolysis nuclei which have been produced by a reaction of titanium salts with alkaline reagents, and in which waste acid and/or wash liquid containing waste acid are added after at least 50% of the total duration of the hydrolysis process.

Preferably, 0.1 to 1.5 m³ of waste acid and/or wash liquid are added per 1 t of $TiO_2$ during the hydrolysis.

If the wash liquid or waste acid containing not only $H_2SO_4$ but also Fe sulphate, Cr sulphate and V sulphate is added instead of water at the beginning of the titanyl sulphate hydrolysis, the hydrolysis yield is reduced and the $TiO_2$ pigment quality deteriorates (also see Examples 2,3 and 5). If, on the other hand, the titanyl sulphate hydrolysis is carried out, according to the invention, using separately produced hydrolysis nuclei which are produced by reaction of titanium salts with alkaline compounds (for example according to German Offenlegungsschrift No. 540 863) and if the waste acid or wash liquid is not added until at least 50% of the total duration of the hydrolysis process has elapsed, the above-mentioned disadvantages, such as reduction of the hydrolysis yield and deterioration of the $TiO_2$ pigment quality, can be avoided and furthermore a substantial increase in the waste acid concentration can be achieved.

By using the process according to the invention, the concentration of the waste acid can be increased by up to 20% compared with the concentration which is achieved by carrying out the process carefully according to the prior art. In addition, an improvement in pigment quality is observed when the process according to the invention is employed.

The addition, according to the invention, of the waste acid or wash liquid is carried out no earlier than 40 minutes after mixing of the titanyl sulphate solution with the hydrolysis nuclei. Preferably, the waste acid or wash liquid is added 90 to 250 minutes after the addition of the hydrolysis nuclei.

The Comparative Examples and Examples which follow are intended to illustrate the advantages of the process according to the invention.

EXAMPLE 1 Comparative Example

Titanyl sulphate solution prepared from the raw materials titanium slag and ilmenite contains titanyl sulphate in an amount corresponding to 230 g/l of $TiO_2$, of which 1.3 g/l are present as Ti(III) sulphate. The weight ratio of $H_2SO_4$: $TiO_2$ is 2.04 and that of $FeSO_4$: $TiO_2$ is 0.5. Furthermore, the solution contains 0.34 g/l of chromium and 0.87 g/l of vanadium as sulphates in addition to other metal sulphates.

To carry out the hydrolysis by the self-nucleation process ("Blumenfeld process"), 0.95 m³ of water at 96° C. are initially taken. While stirring, 0.03 m³ of the above titanyl sulphate solution heated to 96° C. are added rapidly in the course of 2 seconds, followed after 25 seconds by 4.32 m³ of titanyl sulphate solution. The mixture is then brought to the boil by passing in steam and is boiled for 25 minutes until a certain turbidity ("match point") is reached. Thereafter, the passage of steam is interrupted for 30 minutes, after which the mixture is kept at the boiling point for 2.5 hours with steam.

At the end of the hydrolysis process, 5.55 m³ of suspension containing 180 g/l of $TiO_2$ result.

After cooling to 60° C., the hydrolysis product is separated from the waste acid by vacuum filtration and is washed with water, wash liquid, so-called wash acid, being obtained. The hydrolysis product is then bleached by adding Al powder and sulphuric acid and is filtered and washed.

The chemicals phosphoric acid, alkalis and rutile seeds are added to the filter cake and calcination is carried out at 950° C. in a rotary kiln to give rutile pigment. The pigment thus obtained serves as a standard for evaluating the pigments obtained in the further experiments. In all further experiments, the same titanyl sulphate solution is used as a raw material, and processing of the hydrolysis product to the rutile pigment is carried out in an analogous manner. The results of the experiments are summarized in the Table.

EXAMPLE 2 COMPARATIVE EXAMPLE

The hydrolysis is carried out analogously to Example 1, except that, instead of water, wash liquid (wash acid) containing 2% by weight of $H_2SO_4$ is initially taken for self-nucleation.

EXAMPLE 3 COMPARATIVE EXAMPLE

The hydrolysis is carried out analogously to Example 1, except that wash acid containing 5% by weight of $H_2SO_4$ is initially taken instead of water.

The Comparative Examples 2 and 3 show that the process for the hydrolysis of titanyl sulphate, described in U.S. Pat. No. 2,331,496, is not suitable for recycling marked amounts of waste acid or wash acid to the hydrolysis process.

EXAMPLE 4 COMPARATIVE EXAMPLE

Titanyl sulphate solution is hydrolyzed using hydrolysis nuclei which have been produced by reaction of the above titanyl sulphate solution with alkaline compounds ("Mecklenburg process"). 49 l of the separately prepared suspension of hydrolysis nuclei are added to 4.35 m³ of the titanyl sulphate solution (corresponding to 1 t of $TiO_2$). The mixture is brought to the boil by passing in steam and is boiled until the "match point" is reached. Thereafter, the passage of steam is interrupted for 30 minutes, and the mixture is brought to the boil again and is boiled again for 2.5 hours.

After 150 minutes of the total process time have elapsed, 0.92 m³ of water is added, resulting in a $TiO_2$ content of 180 g/l at the end of the process.

EXAMPLE 5 COMPARATIVE EXAMPLE 4.35 m³ of the titanyl sulphate solution are mixed with 49 l of the suspension of hydrolysis nuclei and 0.92 m³ of wash acid containing 10% by weight of $H_2SO_4$ is added. The $TiO_2$ concentration is thus the same as in Example 1 after nucleation. Further hydrolysis and processing of the hydrolysis product are carried out analogously to Example 1.

EXAMPLE 6-8

The hydrolysis is carried out analogously to Example 4, except that wash acid or waste acid is added instead of water after at least 50% of the total duration of the hydrolysis process have elapsed.

The addition is made after 110 minutes in Example 6, after 200 minutes in Example 7 and after 130 minutes in Example 8.

EXAMPLES 9-11

For Examples 9-11, the titanyl sulphate solution has been concentrated from 230 g/l of $TiO_2$ to a $TiO_2$ content of 240 g/l. The hydrolyses are carried out analogously to Example 4. In accordance with the higher $TiO_2$ content, instead of 0.92 m³ of wash acid or waste acid 1.1 m³ can be added in each case in order to achieve the final concentration of 180 g/l of $TiO_2$.

The acids are added after 120 minutes in Example 9 and after 150 minutes in Examples 10 and 11.

Examples 6 to 11 according to the invention show (see Table) that substantial amounts of waste acid or wash acid (=wash liquid containing waste acid) can be recycled to the hydrolysis process without the hydrolysis yield being very adversely affected. Surprisingly, the quality of the rutile pigments prepared under standard conditions from the hydrolysis products is improved by the use of the process according to the invention. By carrying out the process according to the invention, the $H_2SO_4$ content of the waste acid filtered off from the hydrolysis product can be increased from 25% by weight to almost 29% by weight.

| | | Amounts per t of $TiO_2$ in solution | | | | | | | |
|---|---|---|---|---|---|---|---|---|---|
| | | $TiOSO_4$ solution before hydrolysis | | Required for formation of hydrolysis nuclei | Added after mixing of hydrolysis nuclei and $TiOSO_4$ solution | Water as condensate m³ | Liquid for $TiO_2$ final concentration of 180 g/l m³ | Free $H_2SO_4$ in the liquid % | Free $H_2SO_4$ in the waste acid obtained % | Yield at end of hydrolysis % | Brightness of the pigment Ry |
| Example | Process | Amount m³ | g/l $TiO_2$ | | | | | | | | |
| 1 | Self-nucleation | 4.35 | 230 | 0.95 m³ water | — | 0.25 | — | — | 25.0 | 96.6 | ±0 |
| 2 | Self-nucleation | 4.35 | 230 | 0.95 m³ 2% $H_2SO_4$ | — | 0.25 | — | — | 24.7 | 93.5 | −2.5 |
| 3 | Self-nucleation | 4.35 | 230 | 0.95 m³ 5% $H_2SO_4$ | — | 0.25 | — | — | 18.9 | 63 | — |
| 4 | External nucleation | 4.35 | 230 | 0.03 m³ $H_2O$ | — | 0.25 | 0.92 | — | 25.1 | 96.8 | +0.1 |
| 5 | External nucleation | 4.35 | 230 | 0.03 m³ $H_2O$ | 0.92 m³ 10% $H_2SO_4$ | 0.25 | — | — | 26.2 | 96.0 | −0.3 |
| 6 | External nucleation | 4.35 | 230 | 0.03 m³ $H_2O$ | — | 0.25 | 0.92 | 15 | 26.7 | 96.6 | +0.4 |
| 7 | External nucleation | 4.35 | 230 | 0.03 m³ $H_2O$ | — | 0.25 | 0.92 | 20 | 27.4 | 96.3 | +0.5 |
| 8 | External nucleation | 4.35 | 230 | 0.03 m³ $H_2O$ | — | 0.25 | 0.92 | 25 | 28.2 | 96.1 | +0.4 |
| 9 | External nucleation | 4.17 | 240 | 0.03 m³ $H_2O$ | — | 0.25 | 1.1 | 15 | 27.1 | 96.6 | +0.5 |
| 10 | External nucleation | 4.17 | 240 | 0.03 m³ $H_2O$ | — | 0.25 | 1.1 | 20 | 27.9 | 96.2 | +0.4 |
| 11 | External nucleation | 4.17 | 240 | 0.03 m³ $H_2O$ | — | 0.25 | 1.1 | 25 | 28.8 | 95.8 | +0.4 |

What is claimed is:

1. A process for the preparation of $TiO_2$ pigments comprising hydrolyzing titanyl sulphate, isolating an hydrolysis product from waste acid produced in the hydrolysis, washing the hydrolysis product and calcining the hydrolysis product with formation of $TiO_2$ pigments, the improvement comprising carrying out the hydrolysis of the titanyl sulphate with the use of hydrolysis nuclei which have been produced separately by reaction of titanium salts with alkaline reagents, and adding waste acid and/or wash liquid containing said waste acid to the hydrolysis of the titanyl sulphate after at least 50% of the total duration of the hydrolysis process have elapsed.

2. A process according to claim 1, wherein the waste acid and/or wash liquid is added no earlier than 40 minutes after mixing the titanyl sulphate solution with the hydrolysis nuclei.

3. A process according to claim 1, wherein the waste acid and/or wash liquid is added 90 to 250 minutes after the addition of the hydrolysis nuclei.

* * * * *